(12) United States Patent
Kim et al.

(10) Patent No.: US 9,244,249 B2
(45) Date of Patent: Jan. 26, 2016

(54) DOUBLE BALL SLIDE ON MOUNT WITH SCREW OVER SENSOR

(71) Applicant: Gentex Corporation, Zeeland, MI (US)

(72) Inventors: Chul Bock Kim, Gyeonggi-do (KR); Pil Joon Choi, Seoul (KR); Daniel B. Lee, Irvine, CA (US); Danny L. Minikey, Jr., Fenwick, MI (US)

(73) Assignee: GENTEX CORPORATION, Zeeland, MI (US)

( * ) Notice: Subject to any disclaimer, the term of this patent is extended or adjusted under 35 U.S.C. 154(b) by 61 days.

(21) Appl. No.: 14/038,329

(22) Filed: Sep. 26, 2013

(65) Prior Publication Data

US 2014/0091123 A1 Apr. 3, 2014

Related U.S. Application Data

(60) Provisional application No. 61/707,676, filed on Sep. 28, 2012.

(51) Int. Cl.
*B60R 1/04* (2006.01)
*G02B 7/182* (2006.01)
*B60R 1/12* (2006.01)

(52) U.S. Cl.
CPC . *G02B 7/182* (2013.01); *B60R 1/04* (2013.01); *B60R 1/12* (2013.01); *B60R 2001/1223* (2013.01)

(58) Field of Classification Search
CPC .... B60R 2001/1223; B60R 1/04; B60R 1/12; G02B 7/182
USPC .......................................... 224/482, 545, 547
See application file for complete search history.

(56) References Cited

U.S. PATENT DOCUMENTS

| | | | |
|---|---|---|---|
| 4,254,931 A * | 3/1981 | Aikens et al. | 248/549 |
| 4,930,742 A * | 6/1990 | Schofield et al. | 248/475.1 |
| 6,299,319 B1 | 10/2001 | Mertens et al. | |
| 6,341,523 B2 | 1/2002 | Lynam | |
| 7,446,427 B2 * | 11/2008 | Parker et al. | 307/10.1 |
| 7,599,108 B2 | 10/2009 | Lawlor et al. | |
| 7,667,579 B2 | 2/2010 | DeLine et al. | |
| 8,309,907 B2 | 11/2012 | Heslin et al. | |
| 2003/0169522 A1 * | 9/2003 | Schofield et al. | 359/876 |
| 2003/0179473 A1 * | 9/2003 | Krug | 359/838 |
| 2007/0164188 A1 * | 7/2007 | Mordau et al. | 248/503 |
| 2008/0315060 A1 * | 12/2008 | Muller | 248/475.1 |
| 2009/0122430 A1 * | 5/2009 | DeWard et al. | 359/871 |
| 2009/0295181 A1 * | 12/2009 | Lawlor et al. | 296/1.11 |

OTHER PUBLICATIONS

Patent Cooperation Treaty, International Searching Authority, International Search Report, Written Opinion of the International Searching Authority and Notification of Transmittal, Jan. 16, 2014, 7 pages.

* cited by examiner

*Primary Examiner* — J. Gregory Pickett
*Assistant Examiner* — Scott McNurlen
(74) *Attorney, Agent, or Firm* — Price Heneveld LLP; Scott P. Ryan

(57) ABSTRACT

A double ball rearview device mounting assembly includes a bracket having a windshield engagement surface, an internal sensor receiving aperture, and an external clip engagement wall. A sensor is adapted for reception in the internal sensor receiving aperture. A clip is operably coupled to the bracket to secure the sensor. A bracket cover is configured to slide into secure engagement with the bracket and includes a first mounting ball. A barrel is pivotally coupled to the first mounting ball at one end, and is pivotally coupled to a second mounting ball at the other end. A rearview device is operably mounted to the second mounting ball.

18 Claims, 12 Drawing Sheets

DOUBLE BALL SLIDE ON MOUNT WITH SCREW OVER SENSOR

CROSS-REFERENCE TO RELATED APPLICATION

This application claims priority to and the benefit under 35 U.S.C.§119(e) of U.S. Provisional Patent Application No. 61/707,676, entitled "DOUBLE BALL SLIDE ON MOUNT WITH SCREW OVER SENSOR," filed Sep. 28, 2012, the entire disclosure of which is incorporated herein by reference.

BACKGROUND OF THE INVENTION

The present invention generally relates to a mount system for a vehicle, and more specifically to a double ball slide on mount.

SUMMARY OF THE PRESENT INVENTION

In at least one aspect of the present disclosure, a double ball rearview device mounting assembly includes a bracket including a windshield engagement surface, an internal sensor receiving aperture, and an external clip engagement wall. A sensor is adapted for reception in the internal sensor receiving aperture. A clip is operably coupled to the external clip engagement wall of the bracket and supports the sensor in the internal sensor receiving aperture. A bracket cover is configured to slide into secure engagement with the bracket.

In at least one aspect of the present disclosure, a rearview device mounting assembly includes a bracket with a windshield engagement surface, an internal sensor receiving aperture, and a first slide rail on a first side and a second slide rail on a second side. A sensor is adapted for reception in the internal sensor receiving aperture. A clip operably couples the sensor to the bracket. A bracket cover is configured to slide into secure engagement with the first slide rail and the second slide rail. The bracket cover has a mounting ball extending therefrom.

In at least one aspect of the present disclosure, a method of installing a double ball rearview device mounting assembly on a vehicle windshield is provided. The method includes the step of adhering a windshield engagement surface of a bracket to the windshield, with a first slide rail on a first side of the bracket and a second slide rail on a second side of the bracket. A sensor is positioned in the sensor receiving aperture in the bracket and is secured with a clip. A bracket cover is slidingly engaged with the bracket, and the bracket cover at least partially conceals and protects the sensor.

These and other aspects, objects, and features of the present invention will be understood and appreciated by those skilled in the art upon studying the following specification, claims, and appended drawings.

DETAILED DESCRIPTION OF EMBODIMENTS

Figure 1A:
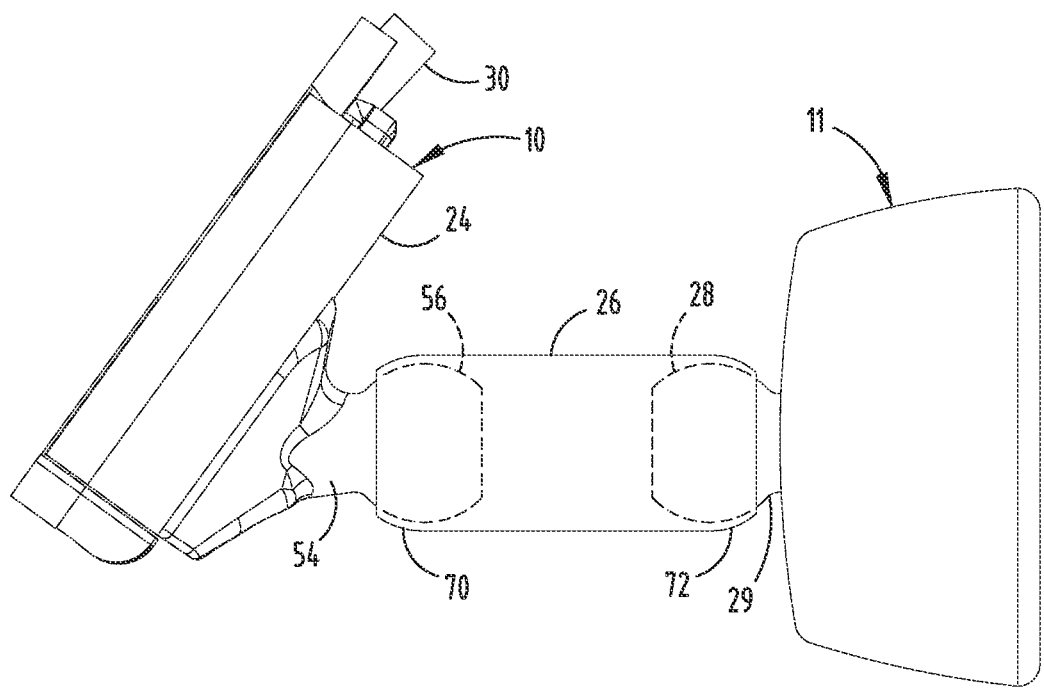
FIG. 1A is a side elevational view of a double ball mounted rearview mirror according to one embodiment of the present disclosure.
Figure 1B:
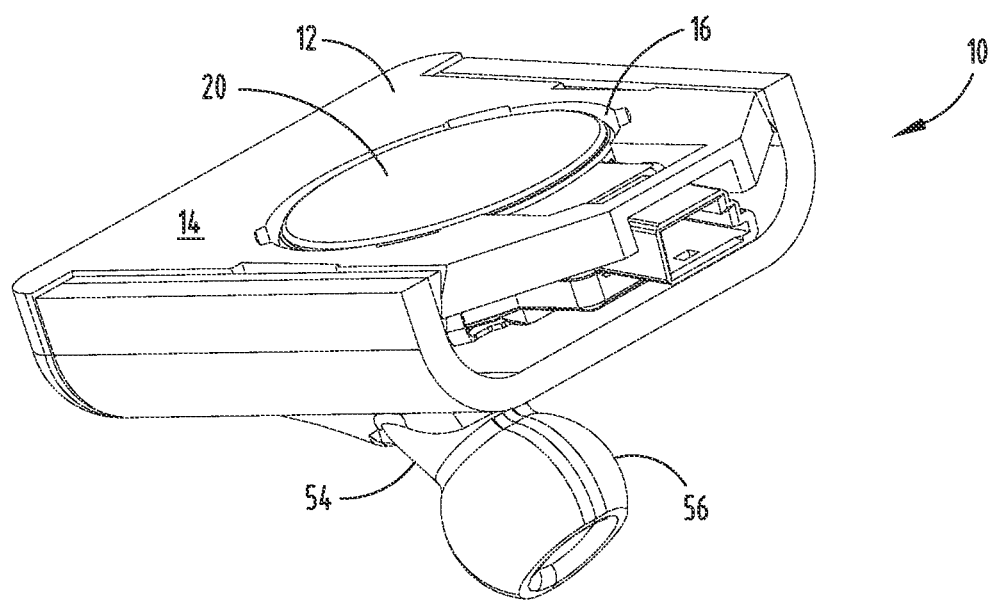
FIG. 1B is a top perspective view of a mounting assembly of the rearview device shown in FIG. 1A.
Figure 2:
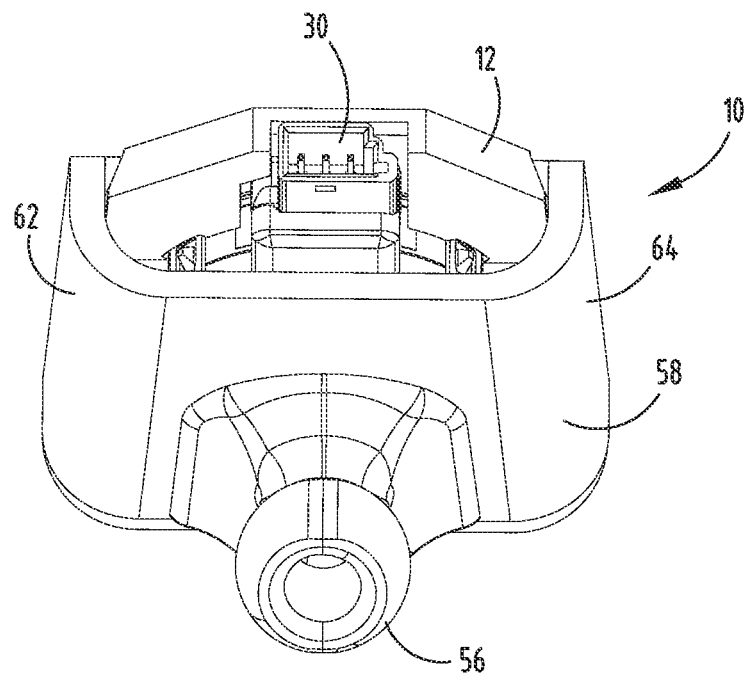
FIG. 2 is a front elevational view of the mounting assembly of FIG. 1B.
Figure 3:
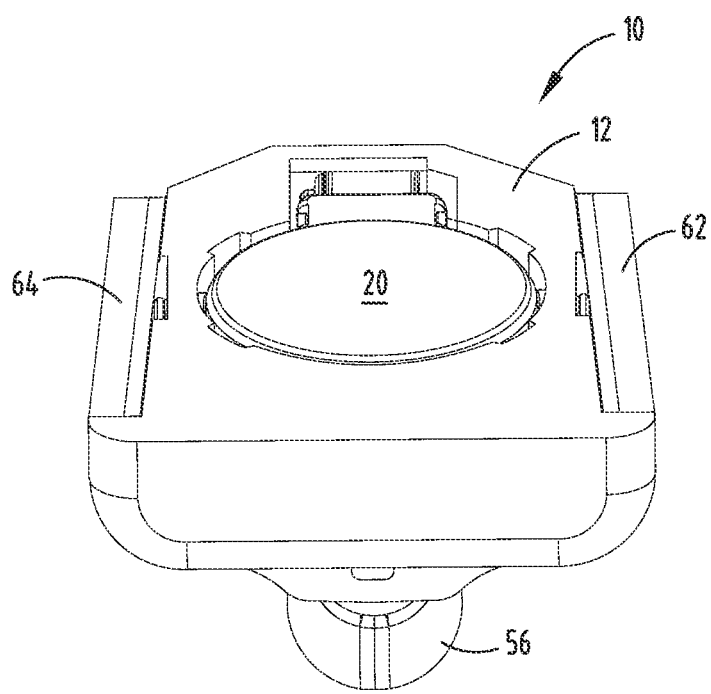
FIG. 3 is a rear elevational view of the mounting assembly of FIG. 1B.
Figure 4:
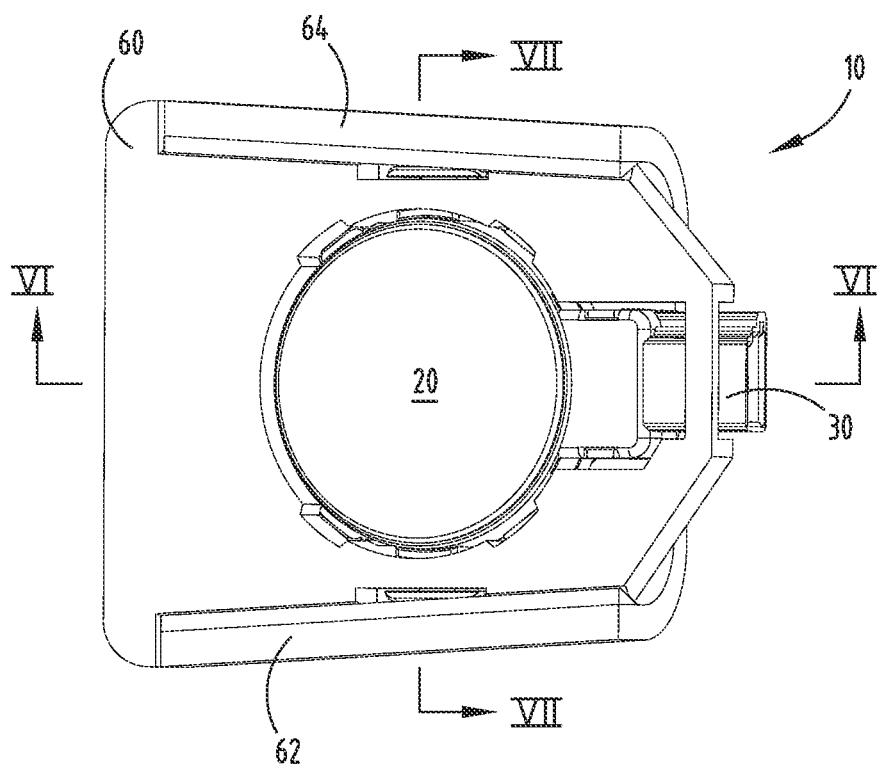
FIG. 4 is a top pan view of the mounting assembly of FIG. 1B.
Figure 5:
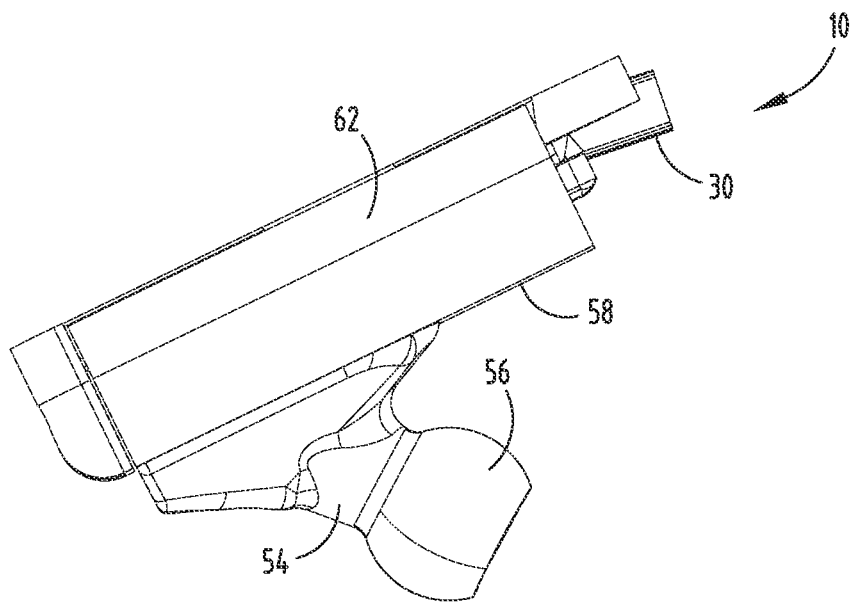
FIG. 5 is a side elevational view of the mounting assembly of FIG. 1B.
Figure 6:
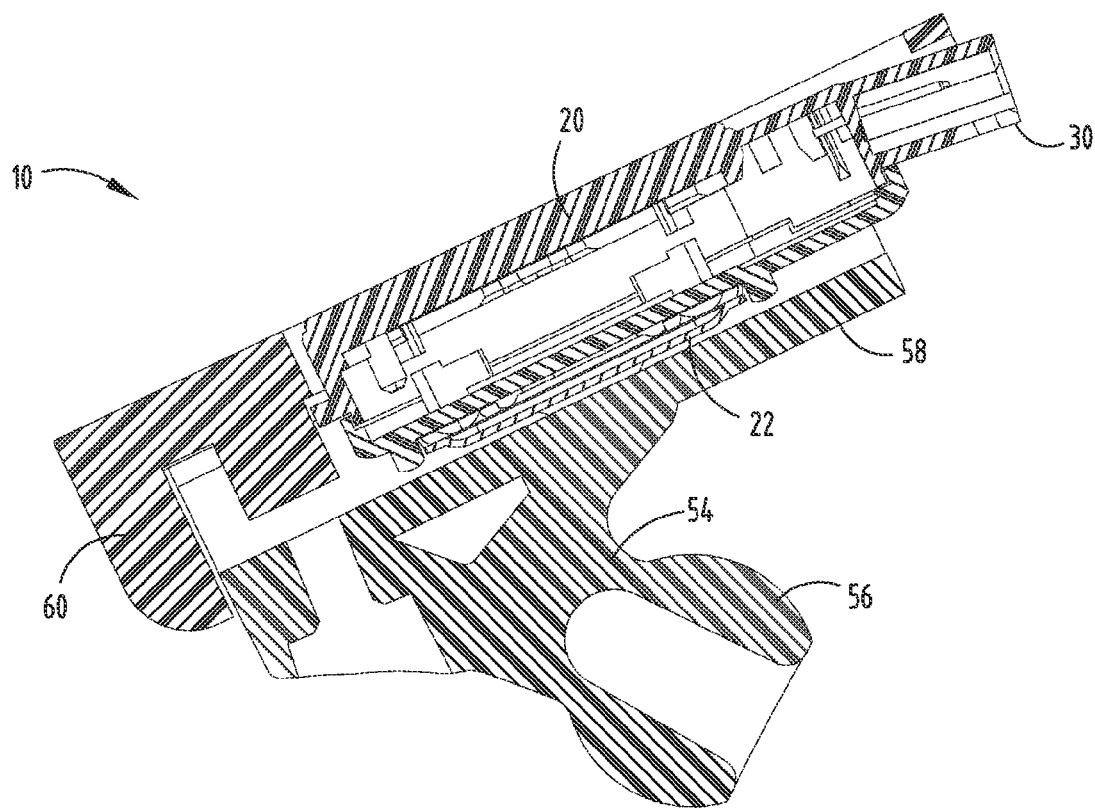
FIG. 6 is a side cross-sectional elevational view of the mounting assembly of FIG. 1B taken along the line VI shown in FIG. 4.
Figure 7:
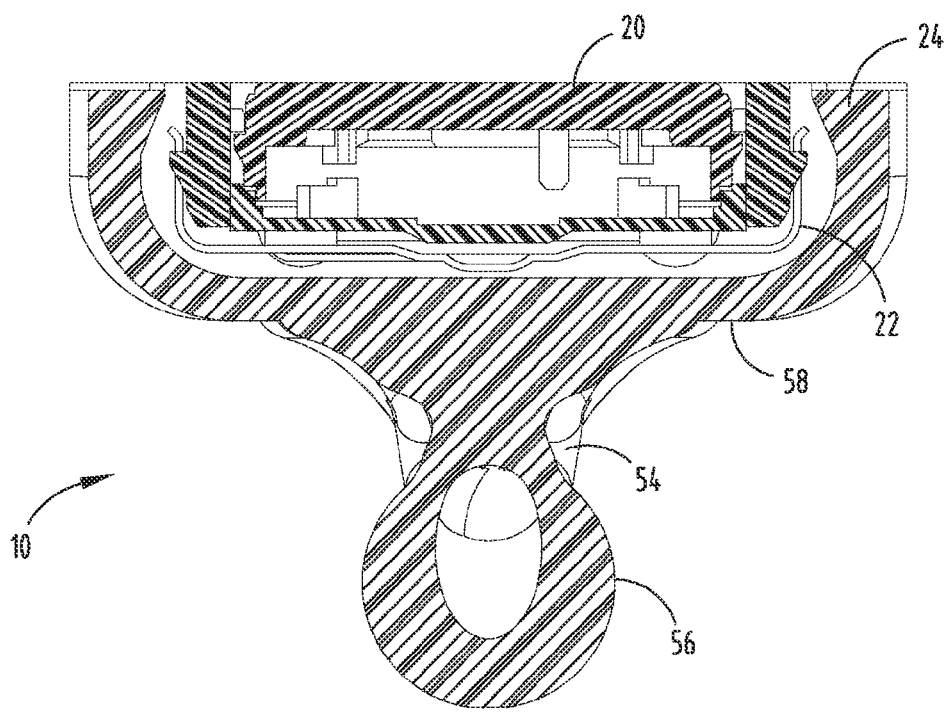
FIG. 7 is a rear cross-sectional elevational view of the mounting assembly of FIG. 1B taken along the line VII shown in FIG. 4.
Figure 8:
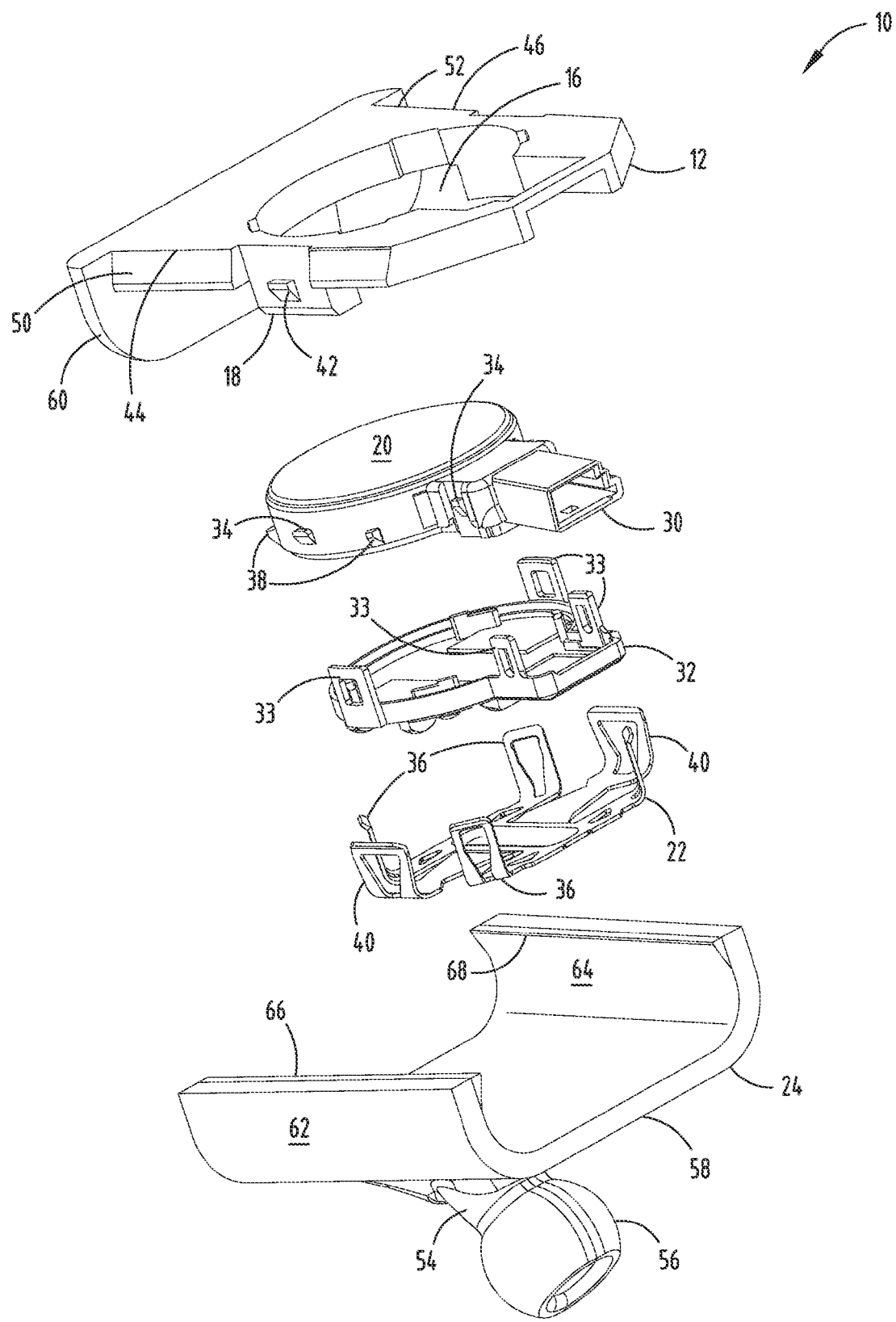
FIG. 8 is an exploded top perspective view of the mounting assembly of FIG. 1B.
Figure 9:
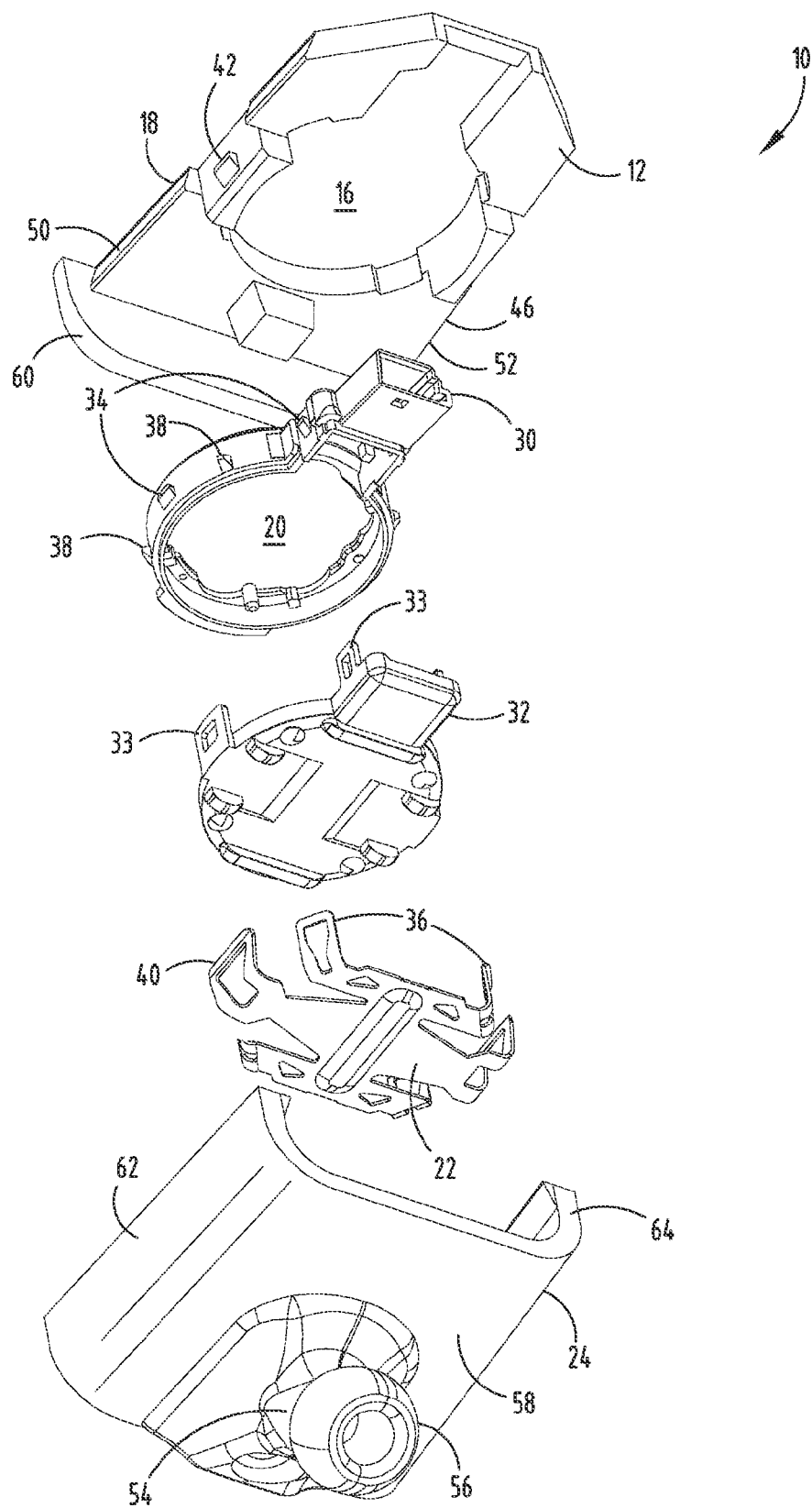
FIG. 9 is an exploded bottom perspective view of the mounting assembly of FIG. 1B.
Figure 10:
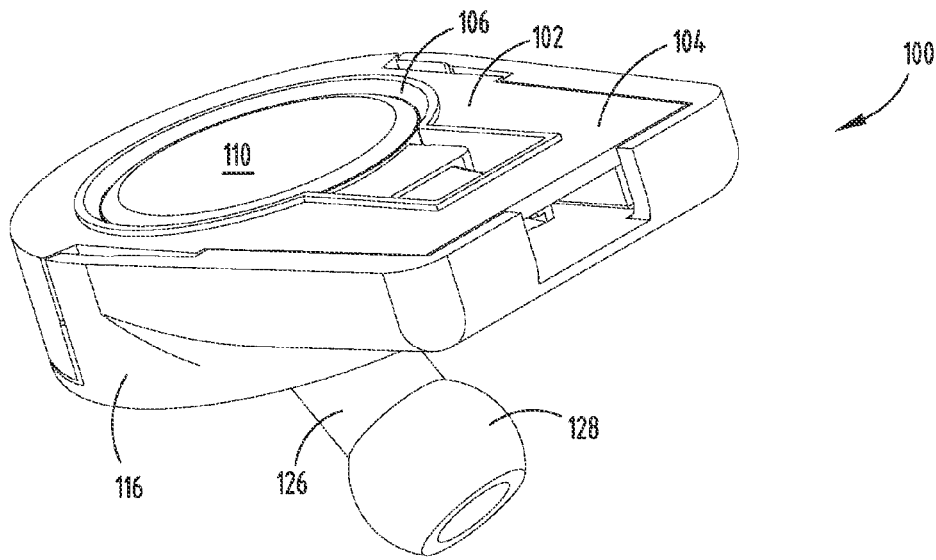
FIG. 10 is a top perspective view of a bracket of a mounting assembly of a rearview device, according to another embodiment of the present disclosure.
Figure 11:
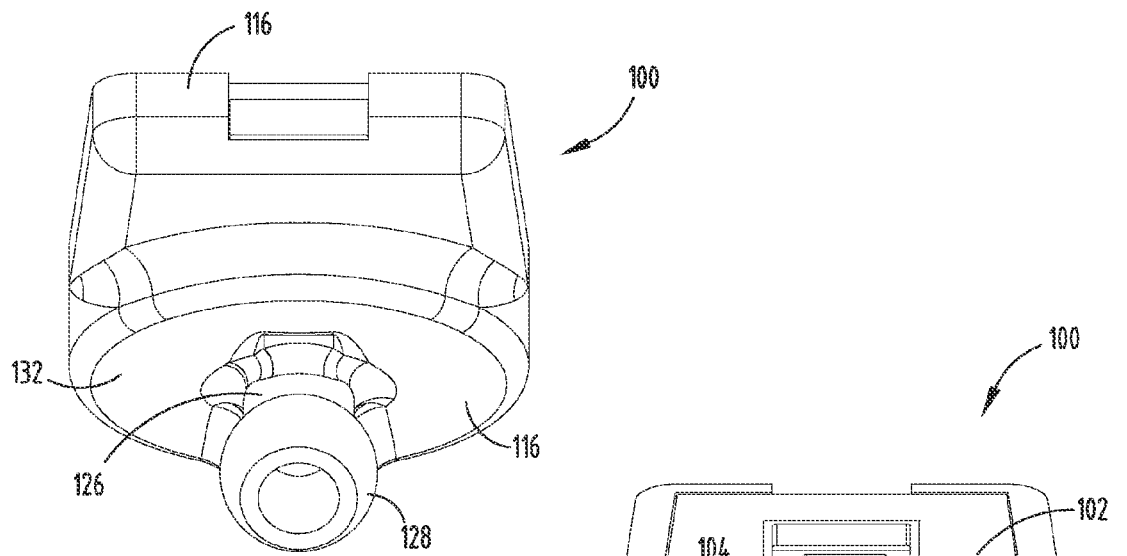
FIG. 11 is a front elevational view of the bracket of FIG. 10.
Figure 12:
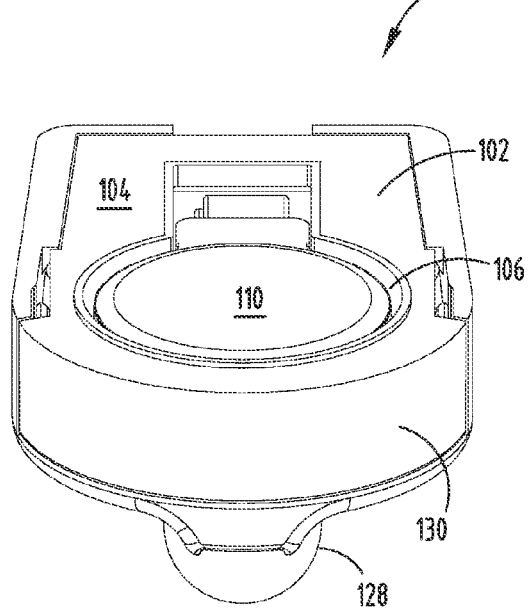
FIG. 12 is a rear elevational view of the bracket of FIG. 10.
Figure 13:
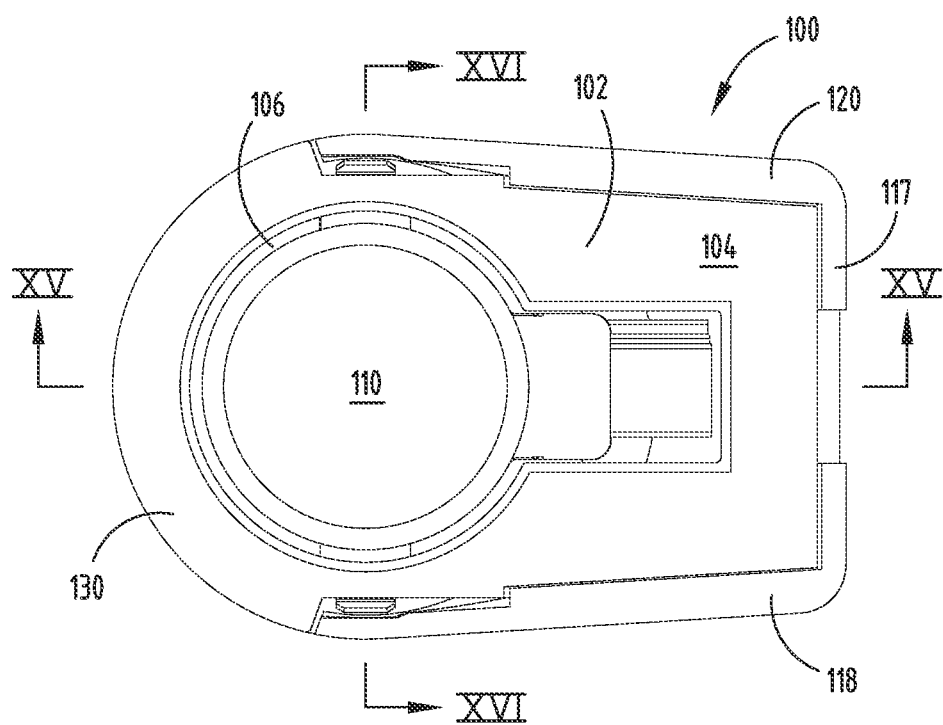
FIG. 13 is a top plan view of the bracket of FIG. 10.
Figure 14:
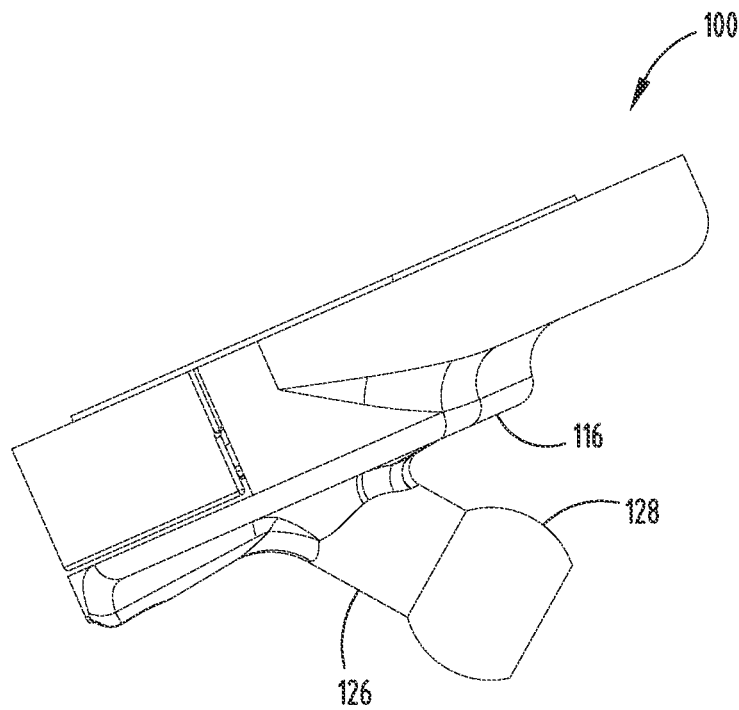
FIG. 14 is a side elevational view of the bracket of FIG. 10.
Figure 15:
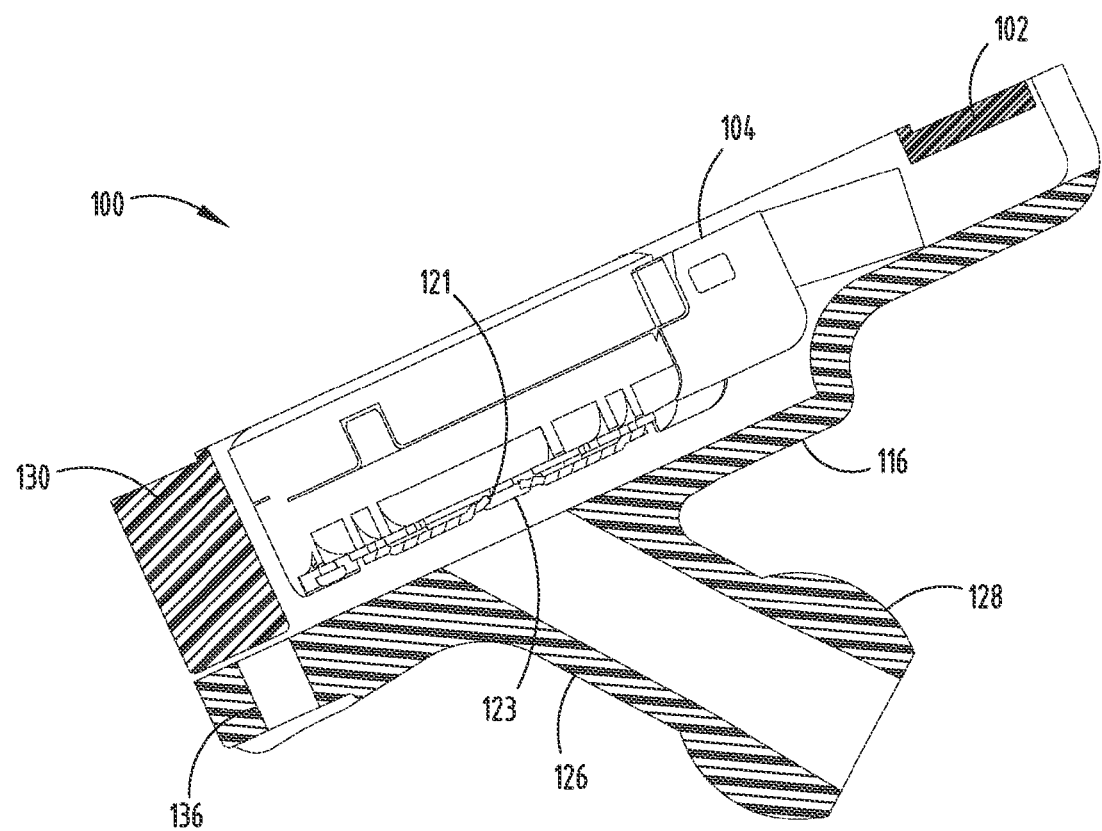
FIG. 15 is a side cross-sectional elevational view of the bracket of FIG. 10 taken along the line XV in FIG. 13.
Figure 16:
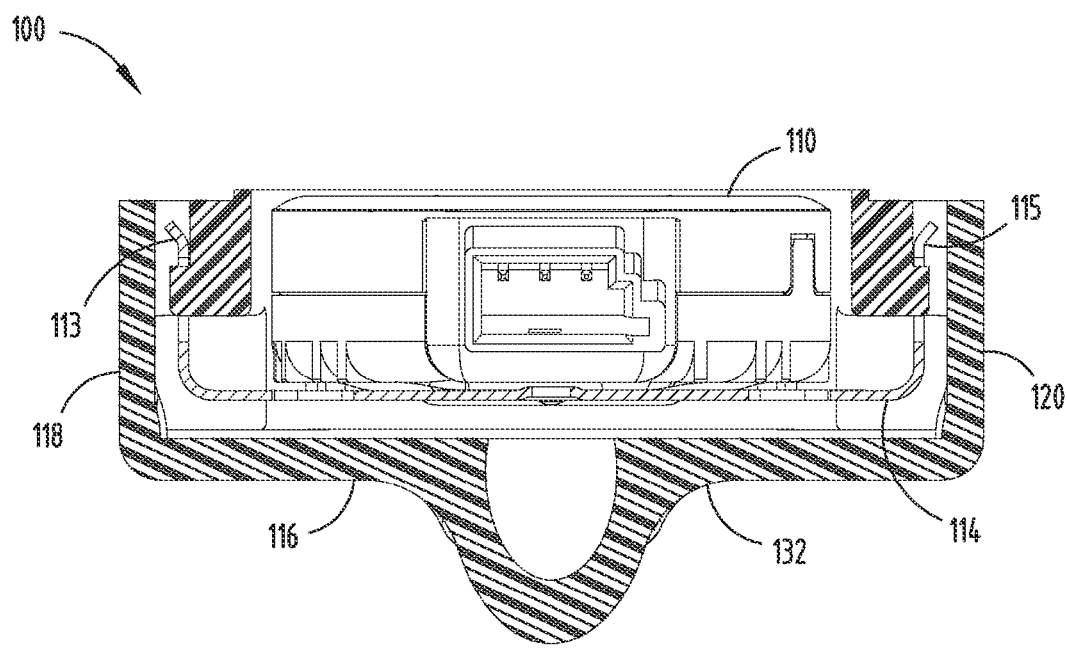
FIG. 16 is a rear cross-sectional elevational view of the bracket of FIG. 10 taken along the line XVI in FIG. 13.
Figure 17:
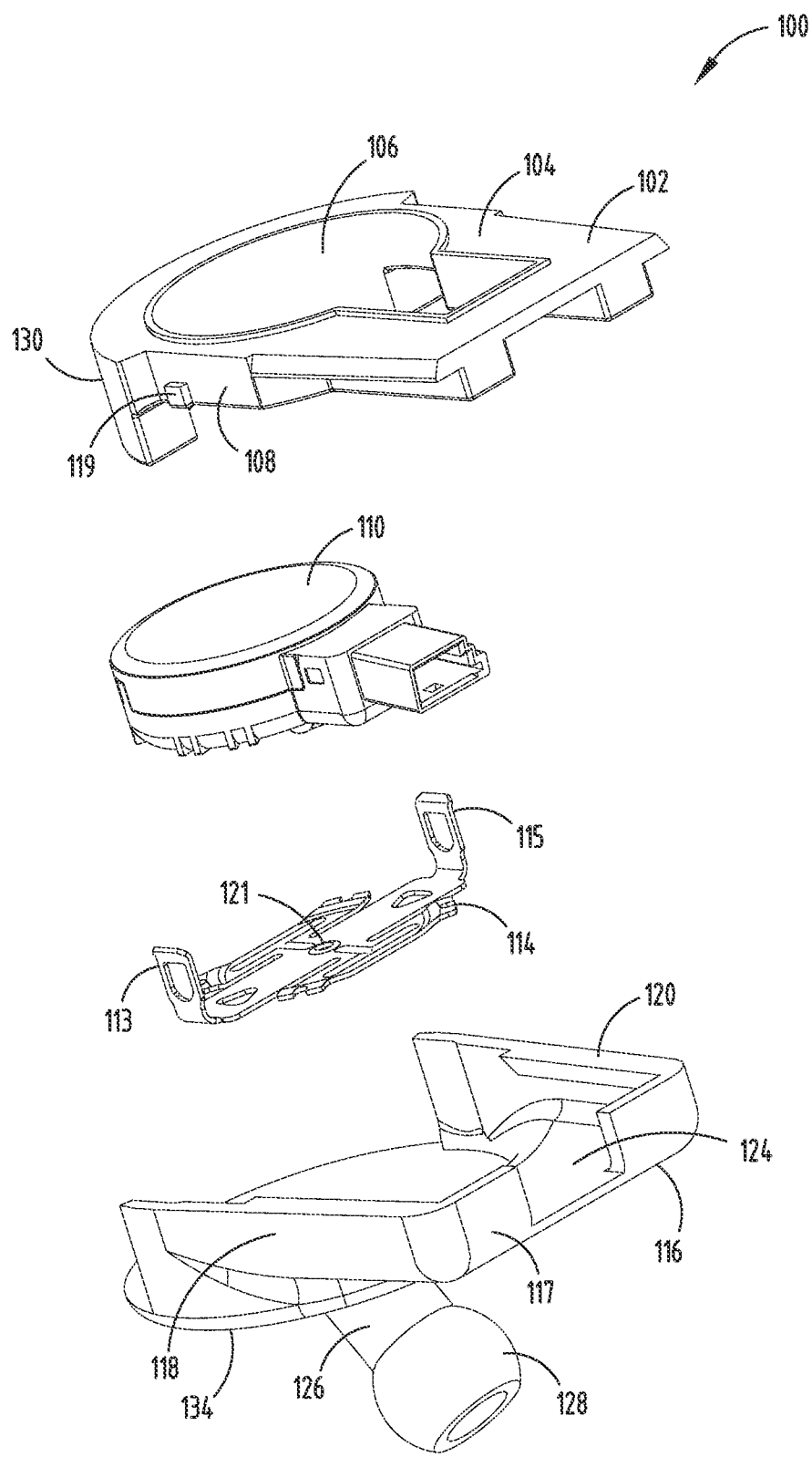
FIG. 17 is a top exploded perspective view of the bracket of FIG. 10.
Figure 18:
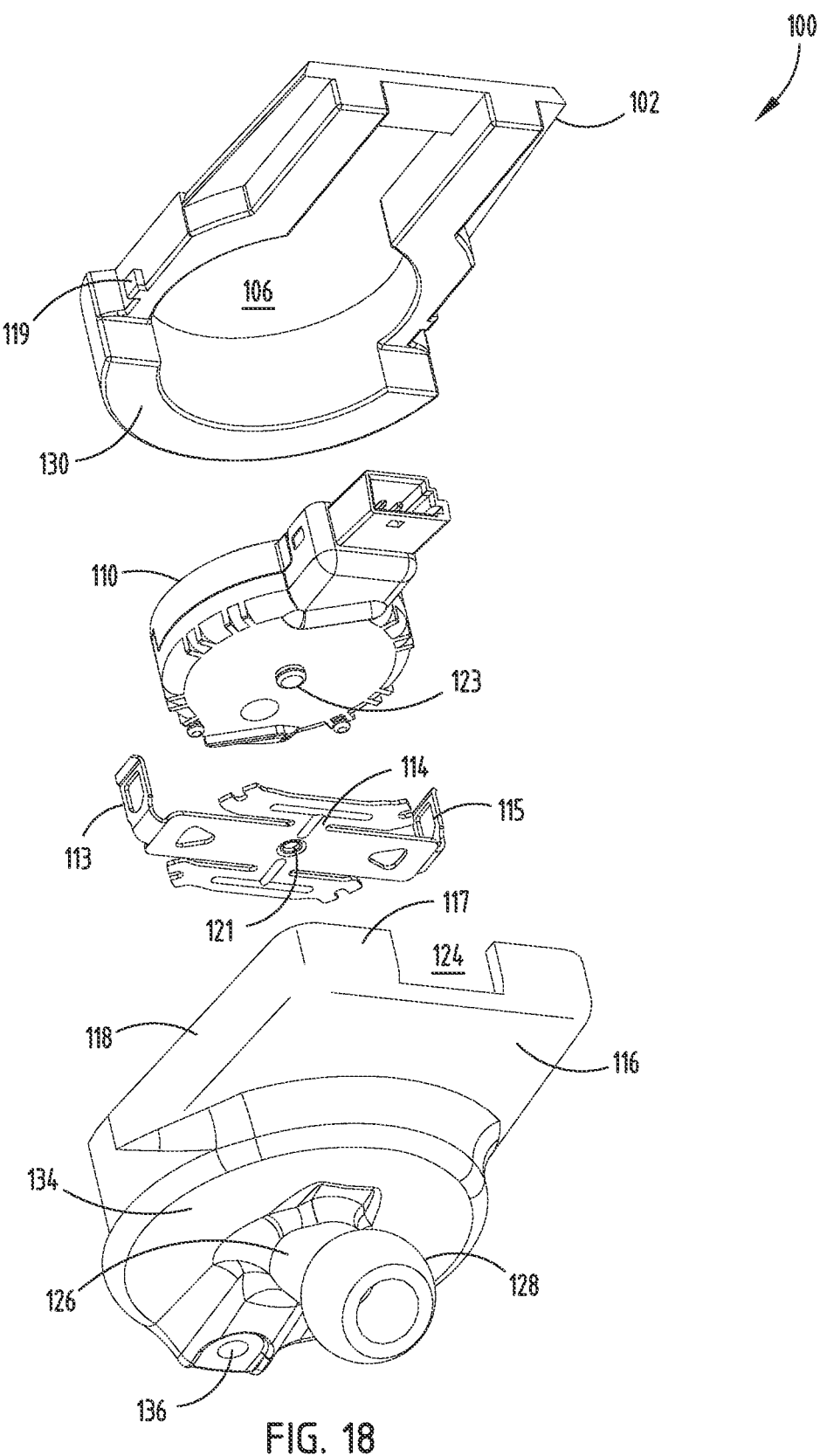
FIG. 18 is a bottom exploded perspective view of the bracket of FIG. 10.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1A-9, reference numeral 10 generally designates a rearview device mounting assembly for mounting a rearview device 11 having a bracket 12 including a windshield engagement surface 14, an internal sensor receiving aperture 16, and an external clip engagement wall 18. A sensor 20 is adapted for reception in the internal sensor receiving aperture 16. A clip 22 is operably coupled to the sensor 20. A bracket cover 24 is configured to slide into secure engagement with the bracket 12. The bracket cover 24 includes a neck 54 and a first mounting ball 56, which are integrated therewith in the embodiment depicted in FIGS. 1A-9. The rearview device mounting assembly 10 further includes a barrel 26 and a second mounting ball 28 and neck 29. The barrel 26 operably couples the first mounting ball 56 and the second mounting ball 28, and the multiple pivot points at each end of the barrel 26 allow for a greater range of motion to fit various cars and various windshield angles. The first mounting ball 56 and second mounting ball 28 provide versatility and maneuverability to the rearview device assembly 10 generally, and the rearview device mounting assembly 10 as described herein reduces the windshield space taken by such a double ball rearview mounting device assembly 10.

Referring again to FIGS. 1A-9, the windshield engagement surface 14 of the rearview device mounting assembly 10 is generally configured for secure connection with an interior side of a windshield of a vehicle. The internal sensor receiving aperture 16 allows for a sensor 20, such as the rain sensor illustrated, to be in direct contact with the interior side of the windshield, or in close proximity to the interior side of the windshield. The internal sensor receiving aperture 16 as shown in the embodiment in FIGS. 1A-9 accommodates a generally round sensor 20, such as a rain sensor, and also accommodates a power and data port 30 of the sensor. The power and data port 30 is adapted to receive power and data lines.

In addition, in at least the embodiment depicted in FIGS. 1A-9, a cradle 32 is adapted to securely fit and support the sensor 20 inside the sensor receiving aperture 16 of the rearview device mounting assembly 10. The cradle includes engagement members 33 that connect with a first set of protrusions 34 on the sensor. The clip 22 secures the cradle 32 and the sensor 20 to the bracket 12. The clip 22 includes engagement members 36 that connect with a second set of outwardly extending protrusions 38 on the sensor 20. In addition, the clip 22 includes lateral engagement members 40 configured to engage outwardly extending protrusions 42 on first and second sides 44, 46 of the bracket 12. Accordingly, the clip 22 maintains secure engagement with both the sensor 20 and the bracket 12 after installation, securing the sensor 20 to the bracket 12 in the desired position, with the sensor 20 extending through the sensor receiving aperture 16 in the bracket 12.

The bracket 12 also includes first and second slide rails 50, 52 configured to securely engage the bracket cover 24, which includes the neck 54 with the first mounting ball 56, as well as a shroud 58. The shroud 58 includes first and second side walls 62, 64. The bracket cover 24 includes complementary slide rails 66, 68 on an inside portion of the first and second side walls 62, 64 of the shroud 58. After assembly of the sensor 20 into the bracket 12, the bracket cover 24 can be slid over the first and second slide rails 50, 52 of the bracket 12. The bracket 12 further includes a rear wall 60, which limits movement of the bracket cover 24 in the rearward direction as it is secured in the slide rails 50, 52. Accordingly, an installer can slide the bracket cover 24 over the bracket 12 to hide the sensor 20, the cradle 32, and the clip 22 from view and to protect the sensor 20. The bracket cover 24 and the rear wall 60 form an enclosure for the sensor 20, and allow wiring to reach the power and data port 30 of the sensor 20.

A first end 70 of the barrel 26 is operably coupled with the first mounting ball 56, and the configuration of the first mounting ball 56 and the neck 54 allow the barrel 26 to be pivoted about the first mounting ball 56. The rearview device 11 is operably coupled to a second end 72 of the barrel 26, using the second mounting ball 28 and neck 29 which are configured to allow the rearview device 11 to be pivoted with respect to the barrel 26.

To install the rearview device mounting assembly 10 as shown in FIGS. 1A-9, the windshield engagement surface 14 of the bracket 12 is secured to a vehicle windshield. The sensor 20 is positioned into the internal sensor receiving aperture 16 of the bracket, and is secured using the clip 22, which is operably coupled to the bracket 12 and the sensor 20. The clip is operably secured by lateral engagement members 40 which are operably engaged with outwardly extending protrusions 42 on first and second sides 44, 46 of the bracket 12. The bracket cover 24 is then slidingly engaged with the bracket 12, to securely engage the first and second slide rails 50, 52 of the bracket 12. The first and second complementary slide rails 66, 68 of the bracket cover 24 are slidingly engaged with the first and second slide rails 50, 52 of the bracket 12. The bracket cover 24 is slid until it reaches the rear wall 60 of the bracket 12. The shroud 58 of the bracket cover 24 at least partially conceals and protects the sensor 20. The first end 70 of the barrel 26 is mounted on the first mounting ball 56 of the bracket cover 24, and the rearview device 11 is mounted on the second end 72 of the barrel 26.

Referring now to FIGS. 10-18, in at least one embodiment of the present invention, a rearview device mounting assembly 100 includes a bracket 102 having a windshield engagement surface 104, an internal sensor receiving aperture 106, and an external clip engagement wall 108. A sensor 110 is configured for reception into the internal sensor receiving aperture 106. A clip 114 includes first and second lateral engagement members 113, 115 that engage outwardly extending protrusions 119. The clip also includes an aperture 121 which receives a protrusion 123 extending from a bottom surface of the sensor 110, preventing lateral movement of the sensor 110 when installed in the sensor receiving aperture 106. The clip 114 also supports the sensor 110 in the vertical direction inside the sensor receiving aperture 106. The rearview device mounting assembly 100 is intended for use with a barrel and second mounting ball as described above.

As shown in at least the embodiment depicted in FIGS. 10-18, a bracket cover 116 extends over the bracket 102 and has a forward wall 117 and first and second side walls 118, 120. The bracket cover 116 is configured for secure engagement with the bracket 102. The bracket 102 includes an arcuate rearward wall 130 configured to abut the first and second side walls 118, 120 of the bracket cover 116. Although FIGS. 10-18 illustrate the bracket 102 with an arcuate rearward wall 130, it is contemplated that the rearward wall 130 could take on a variety of shapes and constructions. The forward wall 117 includes a wire and power line aperture 124 that allows data and power lines to pass through the forward wall 117 into secure engagement with the sensor 110. A neck 126 and a ball 128 extend downward from a shroud 132 of the bracket cover 116. A raised area 134 on the shroud 132 is adjacent the neck 126 and ball 128, and a hole 136 is provided through the raised portion 134. The raised portion 134 covers the arcuate rearward wall 130 and at least a portion of the sensor 110 when the bracket cover 116 is slid over the bracket 102.

To install the rearview device mounting assembly 100 as shown in FIGS. 10-18, the windshield engagement surface 104 of the bracket 102 is secured to the vehicle windshield. The sensor 110 is positioned in the internal sensor receiving aperture 106 of the bracket, and is secured by operably attaching the first and second lateral engagement members 113, 115 of the clip 114 to the outwardly extending protrusions 119 of the bracket 102. The bracket cover 116 is then slid over the bracket 102 and sensor 110, until the side walls 118, 120 of the bracket cover abut the arcuate rearward wall 130 of the bracket 102. Data and power lines are passed through the wire and power line aperture 124 in the forward wall 117 of the bracket cover to power the sensor 110 and allow for the transfer of data to or from the sensor 110.

Figure 19:
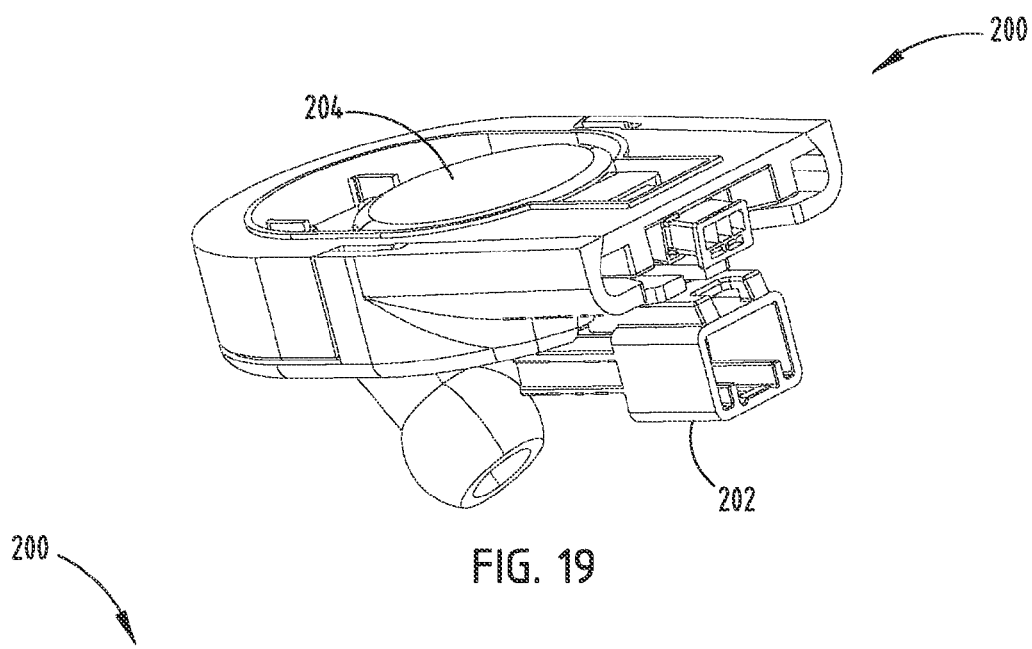
FIG. 19 is a top perspective view of another embodiment of a mounting assembly of a rearview device of the present disclosure.
Figure 20:
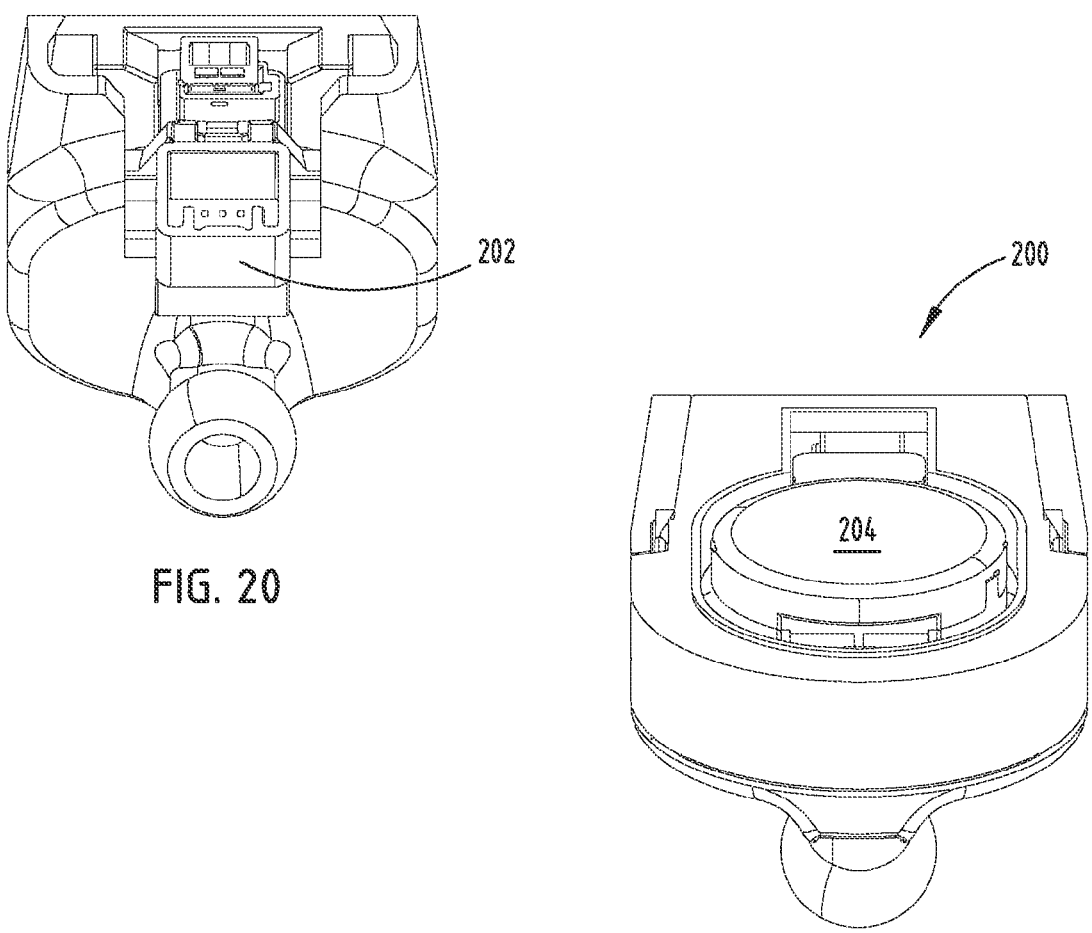
FIG. 20 is a front elevational view of the mounting assembly of FIG. 19.
Figure 21:
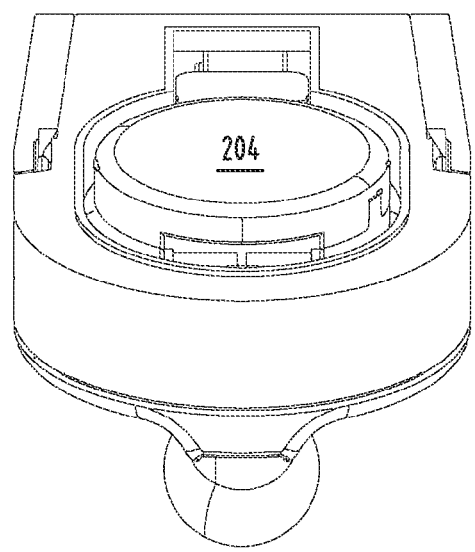
FIG. 21 is a rear elevational view of the mounting assembly of FIG. 19.

Referring now to FIGS. 19-21, in at least one embodiment of the present invention, a rearview device mounting assembly 200 includes a supplemental data port 202 for receiving data and power lines coupled to a sensor 204 inside the rearview device mounting assembly 200. The embodiment depicted in FIGS. 19-21 would be installed in the same manner as previously described herein, though the additional port 202 for data and power lines allows for greater connectivity to the sensor 204. The rearview device mounting assembly 200 is intended for use with a barrel and second mounting ball as described herein.

It will be understood by one having ordinary skill in the art that construction of the described invention and other components is not limited to any specific material. Other exemplary embodiments of the invention disclosed herein may be formed from a wide variety of materials or including features from any of the various embodiments described herein in any combination, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A double ball rearview device mounting assembly comprising:
   a bracket including:
      a windshield engagement surface;
      an internal sensor receiving aperture; and
      an external clip engagement wall;
   a sensor adapted for reception in the internal sensor receiving aperture, wherein the sensor includes a first protrusion and a second protrusion;
   a clip operably coupled to the external clip engagement wall of the bracket and supporting the sensor in the internal sensor receiving aperture, wherein the clip includes a first sensor engagement member operably coupled with the second protrusion on the sensor;
   a cradle disposed between the clip and the sensor, the cradle including a second sensor engagement member operably coupled with the first protrusion on the sensor; and
   a bracket cover configured to slide into secure engagement with the bracket.

2. The double ball rearview device mounting assembly of claim 1, wherein the sensor is a rain sensor.

3. The double ball rearview device mounting assembly of claim 1, wherein the bracket includes a rear wall configured to abut the bracket cover and limit the rearward motion of the bracket cover.

4. The double ball rearview device mounting assembly of claim 1, wherein the clip includes opposing bracket engagement members configured to engage attachment features on an outer wall of the bracket.

5. The double ball rearview device mounting assembly of claim 4, wherein the clip further includes a plurality of sensor engagement members, with each sensor engagement member configured to engage an outwardly extending protrusion on a side wall of the sensor.

6. The double ball rearview device mounting assembly of claim 1, wherein the bracket includes a first side wall with a first rail and a second side wall with a second rail, wherein the first rail and the second rail are configured to slidingly engage the bracket cover.

7. The double ball rearview device mounting assembly of claim 1, wherein the bracket cover includes a shroud to conceal the sensor and the bracket, with a neck and a first mounting ball extending generally downwardly from the shroud for mounting of a rearview device.

8. The double ball rearview device mounting assembly of claim 7, further comprising:
   a barrel with a first end that is pivotally coupled to the first mounting ball extending downwardly from the shroud; and
   a second mounting ball pivotally coupled to a second end of the barrel.

9. The double ball rearview device mounting assembly of claim 1, wherein the bracket cover includes a forward wall having a wire and power line aperture.

10. A rearview device mounting assembly, comprising:
    a bracket including:
       a windshield engagement surface;
       an internal sensor receiving aperture; and
       a first slide rail on a first side and a second slide rail on a second side;
    a sensor adapted for reception in the internal sensor receiving aperture, the sensor having a plurality of protrusions extending therefrom;
    a clip operably coupling the sensor to the bracket;

a cradle disposed between the and the sensor the cradle including a plurality of sensor engagement members operably coupled with the plurality of protrusions extending from the sensor; and a bracket cover configured to slide into secure engagement with the first slide rail and the second slide rail, and having a mounting ball extending therefrom.

11. The rearview device mounting assembly of claim 10, wherein the clip includes a plurality of engagement legs which mechanically engage with outwardly extending protrusions from the bracket.

12. The rearview device mounting assembly of claim 10, wherein the bracket includes a downwardly depending rear wall configured to abut the bracket cover and limit the rearward motion of the bracket cover.

13. The rearview device mounting assembly of claim 12, wherein the rear wall is arcuate.

14. The rearview device mounting assembly of claim 10, wherein the bracket cover includes a forward wall having a wire and power line aperture.

15. The rearview device mounting assembly of claim 14, wherein the bracket cover includes a supplemental data port for receiving data and power lines.

16. A method of installing a double ball rearview device mounting assembly on a vehicle windshield, comprising the following steps:

securing a windshield engagement surface of a bracket to the windshield, with a first slide rail on a first side of the bracket and a second slide rail on a second side of the bracket;

providing a clip with a plurality of legs and a protrusion extending therefrom;

positioning a sensor having a plurality of protrusions, into a sensor receiving aperture in the bracket;

providing a cradle with a plurality of engagement members, wherein the cradle is disposed between the clip and the sensor;

securing the sensor in place by operably coupling the plurality of engagement members of the cradle with the plurality of protrusions of sensor and engaging the legs of the clip with engagement features on the bracket; and slidingly engaging a bracket cover with the bracket, wherein the bracket cover at least partially conceals and protects the sensor.

17. The method of claim 16, wherein the step of slidingly engaging the bracket cover with the bracket includes the step of operably engaging a complementary first slide rail and a complementary second slide rail of the bracket cover with the first slide rail and the second slide rail of the bracket.

18. The method of claim 17, wherein the step of slidingly engaging the bracket cover with the bracket includes the step of sliding the bracket cover rearwardly with respect to the bracket until the bracket cover encounters a rear wall of the bracket.

* * * * *

UNITED STATES PATENT AND TRADEMARK OFFICE
CERTIFICATE OF CORRECTION

PATENT NO. : 9,244,249 B2  
APPLICATION NO. : 14/038329  
DATED : January 26, 2016  
INVENTOR(S) : Kim et al.

Page 1 of 1

It is certified that error appears in the above-identified patent and that said Letters Patent is hereby corrected as shown below:

Col. 7, claim 10, line 1;

After "the" (1$^{st}$ occurrence) insert --clip--,

Col. 7, claim 10, line 1;

After "sensor" insert --,--,

Col. 8, claim 16, line 14;

After "of" (2$^{nd}$ occurrence) insert --the--.

Signed and Sealed this  
Ninth Day of August, 2016

Michelle K. Lee  
*Director of the United States Patent and Trademark Office*